United States Patent [19]

Siddall

[11] 4,368,072

[45] Jan. 11, 1983

[54] IODIDE CELL VAPOR PRESSURE CONTROL

[75] Inventor: Mark B. Siddall, Albany, Oreg.

[73] Assignee: Teledyne Industries, Inc., Los Angeles, Calif.

[21] Appl. No.: 267,525

[22] Filed: May 27, 1981

Related U.S. Application Data

[63] Continuation-in-part of Ser. No. 19,327, Mar. 12, 1979, abandoned.

[51] Int. Cl.³ .................... C22B 34/14; G01N 7/00
[52] U.S. Cl. ........................... 75/84.4; 422/83; 436/148
[58] Field of Search ................ 23/230 R, 230 A; 422/83; 75/84.4

[56] References Cited

U.S. PATENT DOCUMENTS

| | | | |
|---|---|---|---|
| 3,966,458 | 6/1976 | Spink | 75/84.4 X |
| 3,966,460 | 6/1976 | Spink | 75/84.4 |
| 4,072,506 | 2/1978 | Megy | 75/84.4 X |
| 4,239,531 | 12/1980 | Siddall | 75/84.4 |

OTHER PUBLICATIONS

"The Metallurgy of Zirconium", B. Lustman et al., eds., First Edition, pp. 140, 145, 150, 153, McGraw Hill, New York, 1955.

Primary Examiner—Sidney Marantz
Attorney, Agent, or Firm—Shoemaker and Mattare, Ltd.

[57] ABSTRACT

A method of controlling the vapor pressure inside of an iodide decomposition vessel or apparatus for an iodide decomposition process by directly measuring the pressure inside the cell and adjusting the temperature of the lid of the cell. Zirconium and hafnium may be purified by the method.

6 Claims, 2 Drawing Figures

IODIDE CELL VAPOR PRESSURE CONTROL

CROSS REFERENCE TO RELATED APPLICATION

This application is a continuation-in-part application of Ser. No. 19,327, filed Mar. 12, 1979, now abandoned.

FIELD OF THE INVENTION

This invention relates to a method of controlling the condensable vapor pressure inside a glass deposition vessel used for the purification of metals such as zirconium or hafnium by reacting them with iodine and subsequently decomposing the salt to get pure metal and iodine. More specifically, it deals with directly measuring the pressure within the cell and adjusting the temperature of the lid of the cell to control the pressure within or adjusting the iodine flow into the cell.

DESCRIPTION OF THE PRIOR ART

This invention deals with an iodide decompostion vessel as described in *Metallurgy of Zirconium* by Lustman and Kerze, Chapter 5, incorporated herein by reference thereto, and hereinafter referred to as an Iodide Crystal Bar Cell. These cells are used to purify metals such as zirconium or hafnium by reacting the metal with iodine to produce the salt, such as $ZrI_4$ or $HfI_4$, which is subsequently decomposed to $I_2$ and zirconium or hafnium.

It is necessary to control the vapor pressure in an Iodide Crystal Bar Cell to obtain maximum production rate because the vapor pressure within the cell is one of the parameters which control growth rate.

In the past, one method of controlling the vapor pressure in the cell is to predetermine from test runs the amount of iodine necessary for the reaction and then control the amount of iodine introduced into the cell. This method is used on a cell which is completely immersed in a molten salt bath.

Another method of controlling the vapor pressure in the cell is by controlling the temperature of the lid. This is done by making experiments to determine at what lid temperature the best production was obtained, and then maintaining this lid temperature. In this case, the cell is not completely immersed in salt, but only to the extent of allowing the lid to be exposed.

Both of these methods are indirect methods of determining the vapor pressure within the iodide cell. Since they are indirect methods, they are not quite accurate because they depend on the mass, volume and temperature effecting a change in the vapor pressure which is the parameter of interest. Further, there is not a constant relationship between the vapor pressure in the reactor and the temperature of the lid because of condensable impurities. A more direct method is needed in the industry to obtain greater efficiency.

BRIEF SUMMARY OF THE INVENTION

Objects of the Invention

It is, accordingly, one object of the present invention to provide a new process for controlling the vapor pressure within an Iodide Crystal Bar Cell.

An additional object of the present invention is to provide a more efficient method of controlling the vapor pressure within an Iodide Crystal Bar Cell, wherein the vapor pressure within the cell is measured directly and then controlled by adjusting the temperature of the exposed lid of the cell.

A further object of the present invention is to provide a method of controlling the vapor pressure within an Iodide Crystal Bar Cell wherein the vapor pressure within the cell is measured directly and then controlled by constantly adjusting the amount of iodine in the cell.

These and other advantages of the present invention will be apparent from the following detailed description and drawing.

In accordance with the above objects, it has been found that crystal growth in an Iodide Crystal Bar Cell can be increased by controlling more accurately the vapor pressure within the cell. This control can be made more accurate by measuring the vapor pressure in the cell directly as opposed to the prior art methods of measuring the effect of changes in other parameters, such as lid temperature and quantity of iodine on vapor pressure. This pressure measurement is accomplished by the use of a capacitance sensing device on a thin metal diaphragm which registers changes in the vapor pressure in the cell which in turn controls the cooling of the cell lid or which adjust the quantity of iodine in the cell. Although the method of controlling the vapor pressure by cooling the lid of the cell or adjustment of quantity of iodine in the cell is similar to methods of the prior art, the method of determining more accurately the amount of cooling necessary is accomplished by this direct sensing method, which, in turn, produces an increase in production.

DETAILED DESCRIPTION OF THE INVENTION

In accordance with the present invention, it has been found that by making a direct measurement of the vapor pressure within an Iodide Crystal Bar Cell, that this pressure can be more closely controlled than by trying to determine the vapor pressure by indirect means. This direct measure of the vapor pressure is made possible by inserting a pressure sensing device in the lid of the Iodide Crystal Bar Cell.

A better understanding of the invention can be appreciated from the drawings.

Figure 1:
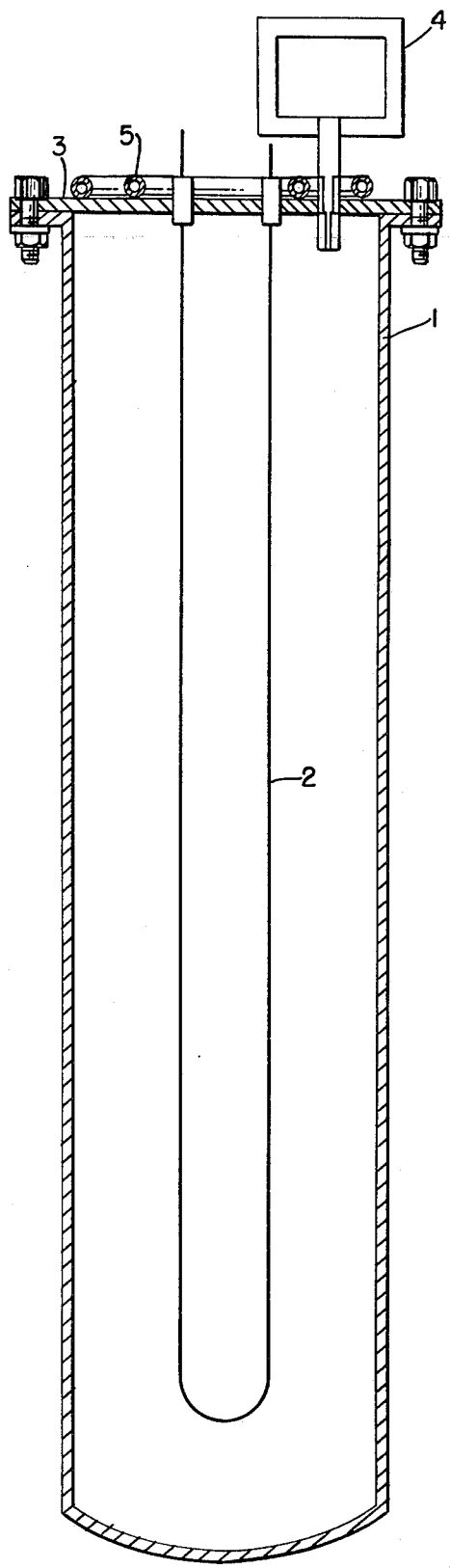
FIG. 1 is a sectional view of an iodide crystal bar cell having the pressure sensing device thereon.

In FIG. 1 there is shown the Iodide Crystal Bar Cell 1 having inserted therein filament 2 for supplying heat to cause the reaction to go to completion. The cell has a lid 3 having inserted therein pressure sensing device 4 for determining the vapor pressure within the cell. When the pressure is determined by the sensing device, the device automatically actuates a valve for increasing or decreasing the flow of the cooling liquid or by adjusting the quantity of iodine in the cell. The cooling liquid is pumped into water cooling coils 5 on the lid and decreases the temperature thereof.

In the crystal bar cell, metal, such as zirconium, is fed into the cell either in loose form using a circular screen so as to form a hollow center or in donut-shaped compacts wherein the heating filament is placed into said hollow center when the lid is put on the cell. After a vacuum is drawn on the cell, the iodine which is heated outside the cell in a sealed chamber is fed into the cell. The iodine, upon entering the cell, becomes a vapor and reacts with the feed metal forming the halogen compound. Subsequently, the heat of the filament causes the halogenated metal to be deposited as the metal on the filament and iodine. By cooling the lid, the halogenated metal is caused to again form into a solid, thus lowering the vapor pressure within the cell. Any pressure gauge capable of measuring vapor condensable above room temperature can be used.

To illustrate the above invention, the following examples were performed.

The iodine cell was operated at a constant controlled pressure and the rate of change of electrical conductance of the crystal bar was measured.

The conductance of a crystal bar is proportional to the cross-sectional area of the crystal bar and so the growth rate is proportional to the rate of change of conductance.

Figure 2:
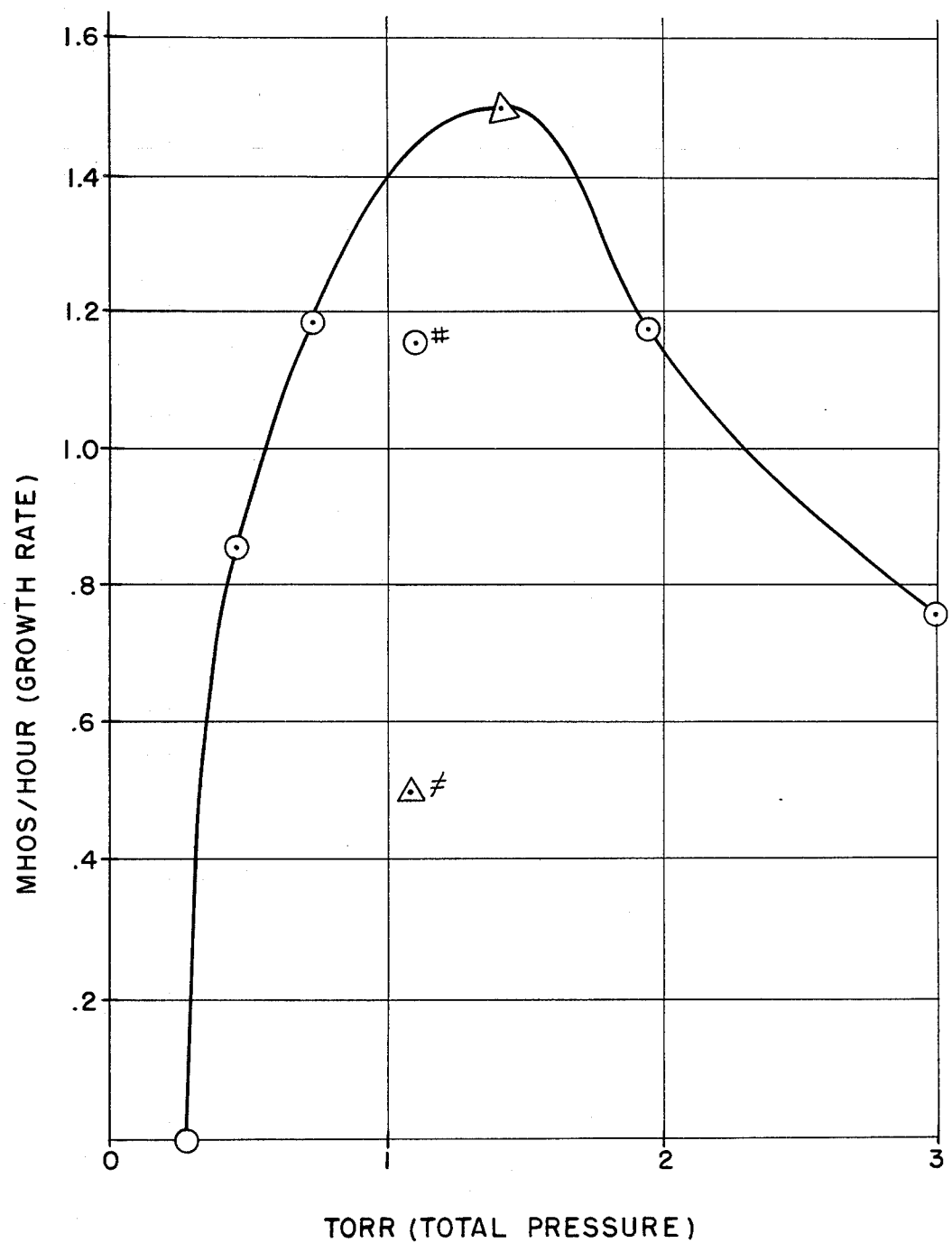
FIG. 2 is a cruve showing growth rate versus total pressure.

The growth rate is summarized in Table I for several values of constant pressure and is presented in FIG. 2 as a single curve composited from two experimental runs. The peak in growth rate occurs at approximately 1.4 TORR total absolute pressure.

TABLE I
HAFNIUM CRYSTAL BAR
CONSTANT PRESSURE GROWTH RATE

| Days From Start | MHOS | Average Pressure (MHg) | Change in MHOS | ÷ | Time Duration Hours | = | Growth Rate (MHOS/Hour) | Run | Symbols | Remarks |
|---|---|---|---|---|---|---|---|---|---|---|
| 5.7 | 90 | 3000 | +6 | | 8 | | 0.750 | 2678 | ⊙ | run symbol |
| 6.4 | 108 | 1950 | +14 | | 12 | | 1.167 | | | |
| 7.5 | 134 | 700 | +19 | | 16 | | 1.188 | | | |
| 8.5 | 165 | 475 | +12(±4) | | 14 | | .857(±.3) | | | |
| 9.6 | 184 | 285 | 0 | | 16 | | .000 | | | |
| 10.6 | 188 | 1150 | 23 | | 20 | | 1.150 | | # | feed material exhausted |
| .8 | 12 | 1400 | 6 | | 4 | | 1.500 | 2694 | Δ | run symbol |
| 1.5 | 31 | 1100 | 6 | | 12 | | .500 | | ≠ | gauge shorted at end of run |

The rate of crystal bar growth is limited by gas phase diffusion in the range of operating conditions encountered in practice. This is proved by observing that the growth rate as a function of crystal bar diameters is a constant, therefore, the deposition process is not rate limiting. The feed process is not rate limiting because the growth rate is reduced only when the feed material is physically exhausted.

Diffusion rate is affected by pressure for two reasons:
(a) With increasing pressure, the mass available for transfer is increased: Mass/time ∝ Pressure;
(b) With decreasing pressure, the mean free path of gas molecules increases, thus lessening the probability of a molecule colliding with another molecule and, therefore, increasing the diffusion velocity: Velocity ∝ (mean free path)$^2$, for a constant concentration gradient. Therefore, the total diffusion rate is the product of mass times velocity.

At some pressure, the diffusion rate will be a maximum because of these opposing tendencies.

It has been determined that the maximum rate is in the range of 0.5 to 2 TORR.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the mete and bounds of the claims or that form their functional as well as conjointly cooperative equivalent are, therefore, intended to be embraced by those claims.

For instance, any type of sensing device which would give an accurate measurement of the vapor pressure within the cell, and which in turn can be made to control the flow of the cooling liquid may be used.

What is claimed is:

1. A method of controlling the vapor pressure in an iodide decomposition cell comprising: directly measuring the vapor pressure in the cell; and adjusting the lid temperature of the cell by controlling the rate of cooling of the lid in response to variations in the vapor pressure.

2. The method of claim 1 wherein the cell is used for the purification of zirconium.

3. The method of claim 1 wherein the cell is used for the purification of hafnium.

4. The method of controlling the vapor pressure in an iodide decomposition cell comprising directly measuring the vapor pressure in the cell and adjusting the iodine content of the cell.

5. The method of claim 4 wherein the iodine content of the cell is adjusted by adding iodine to the cell.

6. The method of claim 4 wherein the iodine content of the cell is adjusted by removing iodide reactants from the cell.

* * * * *